UNITED STATES PATENT OFFICE.

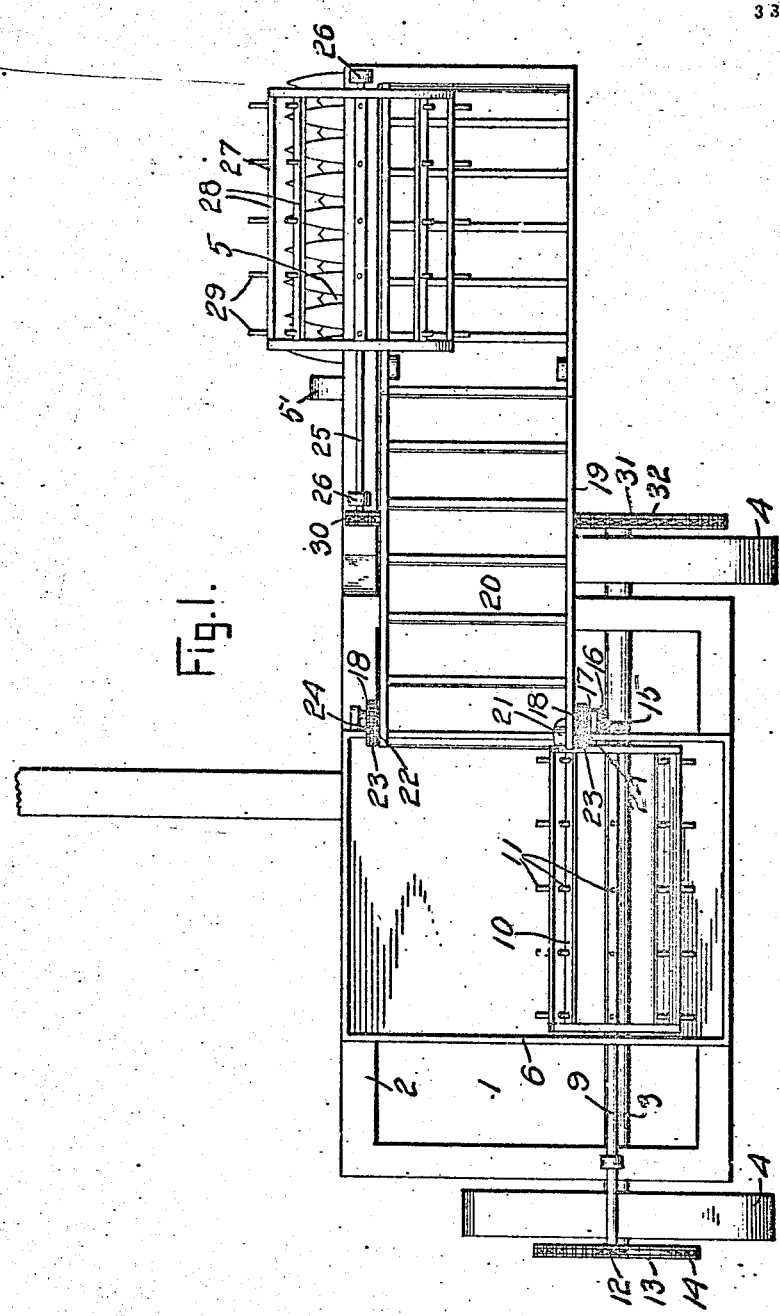

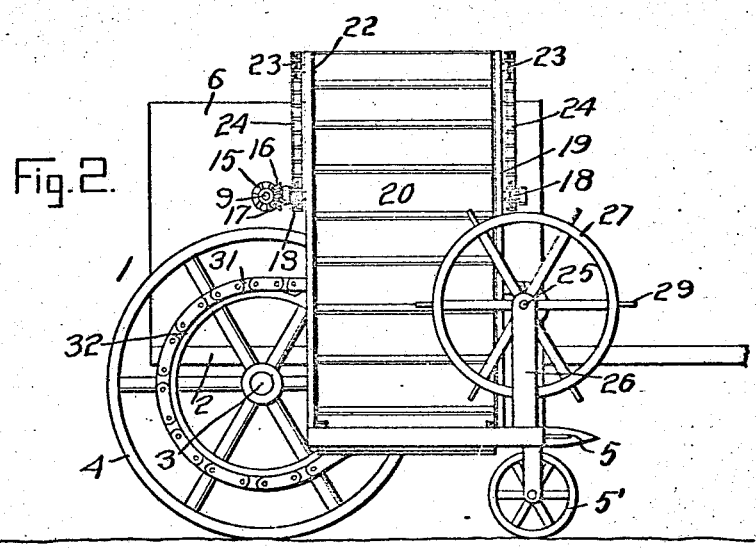

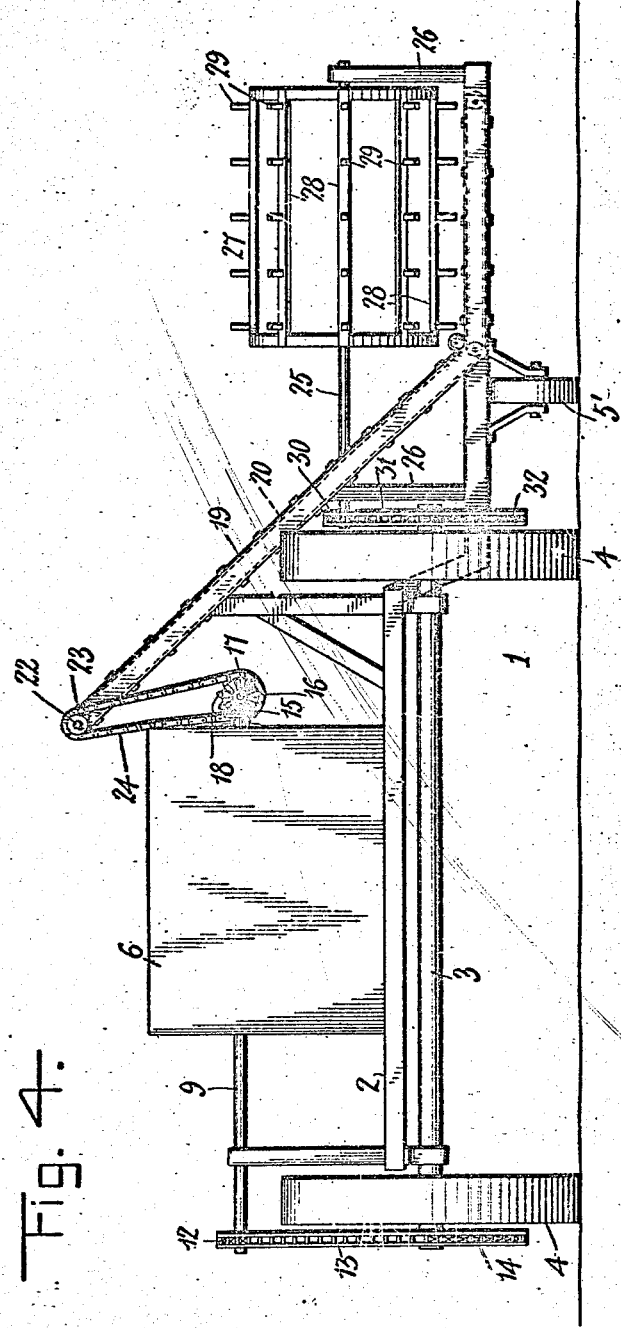

JESSE H. RECTOR, OF MURL, KENTUCKY.

SEPARATOR.

No. 895,040.  
Specification of Letters Patent.  
Patented Aug. 4, 1908.

Application filed June 5, 1907. Serial No. 377,439.

*To all whom it may concern:*

Be it known that I, JESSE H. RECTOR, a citizen of the United States, residing at Murl, in the county of Wayne, State of Kentucky, have invented certain new and useful Improvements in Separators; and I do hereby declare the following to be a full, clear, and exact description of the invention, such as will enable others skilled in the art to which it appertains to make and use the same.

This invention relates to new and useful improvements in separators, and it has particular reference to an attachment for mowing machines, the object being to provide novel means for conveying the pods from the sickle bar to the separating cylinder.

The details of construction will appear in the course of the following description, in which reference is had to the accompanying drawings forming a part of this specification, like characters of reference designating similar parts throughout the several views, wherein—

Figure 1 is a top plan view of a machine embodying the improvements comprehended in the present invention. Fig. 2 is an end elevation of such a machine. Fig. 3 is a detailed longitudinal section illustrating the construction of the separating cylinder. Fig. 4 is a rear elevation.

Referring specifically to the accompanying drawings, the numeral 1 designates a mowing machine of conventional form including the frame 2, the axle 3, the traction wheels 4, carried thereby, the sickle bar 5, and the caster wheel 5' arranged beneath the sickle bar. Upon the frame 2 is supported a receptacle 6, within which is mounted the concave 7 having the teeth 8. Journaled in the side walls of the receptacle 6 is a transverse shaft 9 carrying the cylinder 10, which coöperates with the concave 7, and to this end is formed with teeth 11. The concave 7 and cylinder 10 conjointly constitute the mechanism for separating the hulls and stems from the beans or peas. The shaft 9 projects beyond the receptacle 6 and on one end carries a sprocket wheel 12, which is driven by a chain 13 from a sprocket wheel 14 on the axle 3. The shaft 9, at its other end, carries a beveled pinion 15 meshing with a similar pinion 16 in the end of a longitudinal shaft 17, the latter carrying sprocket wheels 18.

Supported from the frame 2 is an inclined elevator frame 19, over which an endless conveyer 20 has movement transversely of the mowing machine, and in the rear of the sickle bar 5. The conveyer 20 is trained over an upper pulley 21 carried on a shaft 22 and the latter carries at its ends sprocket wheels 23, which are driven by chains 24 from the sprocket wheels 18. A transverse shaft 25 is supported in bearings 26 forwardly of the conveyer 20, and the shaft 25 carries a drum 27 equipped with transverse rake bars 28 having radially projecting teeth 29, the function of the drum 27 being to feed the pods from the sickle bar upon the conveyer 20, which transfers them to the separating mechanism above described. The shaft 25 carries at its inner end a sprocket wheel 30, which is driven by a chain 31 from a sprocket wheel 32 provided at the adjacent end of the axle 3.

The attachment comprehended in the present invention is simple in construction, inexpensive to manufacture and practical and efficient in use.

From the foregoing description, it will be seen that simple and efficient means are provided for accomplishing the objects of the invention, but, while the elements herein shown and described are well adapted to serve the functions set forth, it is obvious that various minor changes may be made in the proportions, shape and arrangement of the several parts without departing from the spirit and scope of the invention as defined in the appended claims.

What is claimed, is—

In a device of the type set forth, the combination with a mowing machine including a frame, a sickle bar, a power shaft, traction wheels on said power shaft, and sprocket wheels on said power shaft, of a receptacle, a toothed concave therein, a transverse shaft projected therethrough, a drum mounted on said transverse shaft, said transverse shaft carrying at one end thereof a sprocket wheel, a chain trained over said sprocket wheel and over one of the sprocket wheels of said power shaft, an elevator frame, an inclined endless conveyer in the rear of said sickle bar and movable over said frame transversely of said machine, a shaft journaled longitudinally of the machine, gearing between said longitudinal shaft and said transverse shaft, said endless conveyer including a shaft journaled transversely of said elevator frame and located at the upper end thereof, gearing between said longitudinal shaft and said last named shaft, a second transverse shaft provided at one end with a sprocket wheel, a chain trained over said last named sprocket wheel and over the other sprocket wheel on said power shaft, and a toothed cylinder carried by said last named shaft and arranged to transfer material from said sickle bar to said conveyer.

In testimony whereof, I affix my signature in presence of two witnesses.

JESSE H. RECTOR.

Witnesses:
C. W. RECTOR,
J. D. GUFFEY.